United States Patent

Noble et al.

[11] Patent Number: 5,722,621
[45] Date of Patent: Mar. 3, 1998

[54] BIPOD LOAD SUPPORT

[75] Inventors: Jack Noble; Seiya Sakurai, both of Seattle, Wash.

[73] Assignee: The Boeing Company, Seattle, Wash.

[21] Appl. No.: 567,621

[22] Filed: Dec. 5, 1995

[51] Int. Cl.$^6$ .................... B64C 3/50; B64C 9/02
[52] U.S. Cl. .................... 244/215; 244/129.1; 244/131
[58] Field of Search .................... 244/213, 215, 244/216, 217, 129.1, 131; 248/284.1

[56] References Cited

U.S. PATENT DOCUMENTS

| | | |
|---|---|---|
| 2,158,676 | 5/1939 | Engelhardt . |
| 2,653,071 | 9/1953 | Lundstrom .................... 248/284.1 X |
| 3,438,599 | 4/1969 | Welzen .................... 244/216 |
| 3,767,140 | 10/1973 | Johnson . |
| 3,785,594 | 1/1974 | Lee . |
| 4,248,395 | 2/1981 | Cole . |
| 4,434,959 | 3/1984 | Rudolph . |
| 4,448,375 | 5/1984 | Herndon .................... 244/216 |
| 4,471,928 | 9/1984 | Cole . |
| 4,669,687 | 6/1987 | Rudolph . |
| 4,892,274 | 1/1990 | Pohl et al. .................... 244/215 X |

*Primary Examiner*—William Grant
*Attorney, Agent, or Firm*—Christensen, O'Connor, Johnson & Kindness PLLC

[57] ABSTRACT

A first upright leg has an upper end pivoted to the body of an aircraft by a first bracket secured to the aircraft skin, alongside a second leg pivoted to the aircraft by a second bracket. The bottom ends of the first and second legs are pivoted to a load bearing member which extends generally upward between them. The load bearing member has a load connection point for pivotal attachment of the aft end of an aircraft trailing edge flap track thereto. Upward force applied at the load connection point by the aft end of the track biases the first leg, second leg and load bearing member to a stable central equilibrium position from which the aft end of the track can move laterally a few inches in either direction. Such force is transmitted primarily through one of the legs, rather than through both legs, and is applied to the body of the aircraft primarily as shear rather than as a punch load.

18 Claims, 3 Drawing Sheets

5,722,621

BIPOD LOAD SUPPORT

FIELD OF THE INVENTION

The present invention relates to a swinging support for a member bearing a load primarily in a first direction, and enabling limited lateral movement of the load bearing member from a central position in opposite directions generally perpendicular to the first direction, and in which the central position constitutes a stable equilibrium position such that the support tends to return the load bearing member to the central position. A specific application for the support of the present invention is to mount the aft end of an aircraft trailing edge flap track to the body of the aircraft, with the load on such aft end of the track being directed primarily upward, and enabling limited lateral movement of the track aft end toward and away from the aircraft body.

BACKGROUND OF THE INVENTION

Trailing edge flaps for wings of large commercial aircraft are shiftable chordwise of the wing and/or tiltable to alter the angle of incidence relative to the wing. Such flaps can be supported by special linkages which may also incorporate elongated tracks extending lengthwise of the aircraft. In some constructions, the linkages and tracks are supported directly from the wing, in which case all component parts move with the wing and relative movement between the wing and body of the aircraft is not a concern. Representative constructions for shifting trailing edge flaps are shown in the following U.S. patents:

Johnson, U.S. Pat. No. 3,767,140, issued Oct. 23, 1973;
Rudolph, U.S. Pat. No. 4,434,959, issued Mar. 6, 1984;
Cole, U.S. Pat. No. 4,248,395, issued Feb. 3, 1981;
Cole, U.S. Pat. No. 4,471,928, issued Sept. 18, 1984;
Rudolph, U.S. Pat. No. 4,669,687, issued Jun. 2, 1987.

In other constructions, an elongated track for a trailing edge flap is supported directly from the body of the aircraft. For example, in a Boeing 767, a generally horizontal, arcuate track has its aft end supported by a tripod consisting of two lower horizontal legs angled outward from their points of connection to the aircraft body and a longer upright leg having its lower end fixed to the outer ends of the horizontal legs. The junction of the three legs is fixed relative to the body of the aircraft and constitutes the load bearing support point for the aft end of the track. However, the attitude of the aircraft wing and its trailing edge flap relative to the body of the aircraft is slightly different when the aircraft is on the ground than when the aircraft is in the air, and the body and wing do not always maintain precisely the same relative positions even in flight. Additionally, relative deflections can occur during shifting of the trailing edge flap along the track. Consequently, it is desirable for the track to be mounted in such a way that it may move inboard or outboard a few inches, yet have positive stability, i.e., tend to return to a central position. In the case of the Boeing 767, this is achieved by mounting the aft end of the track to the tripod support by a short swingable "tension link." Since the load on the aft end of the track is directed upward, the tension link extends substantially vertically from the tripod support point to the aft end of the track. The result is similar to an upside down pendulum in that the upward directed force applied by the aft end of the track tends to return the tension link to a central vertical position.

In the case of the Boeing 767, the connection points of the tripod legs to the aircraft body overlie a heavily reinforced area of the frame, namely, one of the wheel wells. When it was decided to use essentially the same flap actuating mechanism in the more recently developed Boeing 777, it was discovered that the different placement of the wing and wheel wells would result in the tripod connection points overlying a much less reinforced area of the frame. In particular, unacceptable loads generally radially of the arcuate body ("punch loads") would be incurred, making the known tripod support unfeasible, and attempts to modify the tripod support for use on the 777 were not successful.

SUMMARY OF THE INVENTION

The present invention provides a bipod support for a member to which a substantial load is applied primarily in a first direction (e.g., upward), yet permitting limited movement of the load bearing member in a second direction perpendicular to the first direction (e.g., horizontally), and having positive stability in that when force is applied in the first direction the load bearing member is biased to a stable central position. In the preferred embodiment, the support includes a first upright leg pivoted at its upper end for swinging about a first axis, a shorter second upright leg pivoted at its upper end for swinging about a second axis lower than and offset laterally from the first axis, such first and second legs being angled downward and toward each other at small acute angles to vertical and having bottom ends approximately aligned horizontally. The bottom ends of the legs are pivoted to a lower portion of a load bearing member at horizontally spaced locations. From the bottom pivot points, the load bearing member extends generally upward between the first and second legs. Upward directed force applied to the upper portion of the load bearing member tends to swing it to a central stable equilibrium position, while permitting limited lateral swinging of the member from such position in opposite directions toward the first and second legs, respectively. Stops are provided to limit the permitted motion of the upper portion of the load bearing member.

In the preferred application of the present invention for supporting the aft end of a trailing edge flap track, the longer first leg is secured to the body of the aircraft by an upper bracket with the length of the first leg at a very small acute angle relative to the tangent of the arcuate body at the connection location, and the load bearing member is constructed such that its point of connection to the load is much closer to the first leg than to the shorter second leg. In fact, a line connecting the load connection point and the upper pivot for the first leg is nearly tangential to the aircraft body. Consequently, upward force applied to the load bearing member by the aft end of the track is transmitted primarily by the first leg to the upper bracket, and such load is transmitted through the bracket primarily as shear rather than as an undesirable radial force or punch load. The invention removes some of the criticality of the location of connection of the track support, and permits the otherwise conventional track to be used with a different aircraft.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
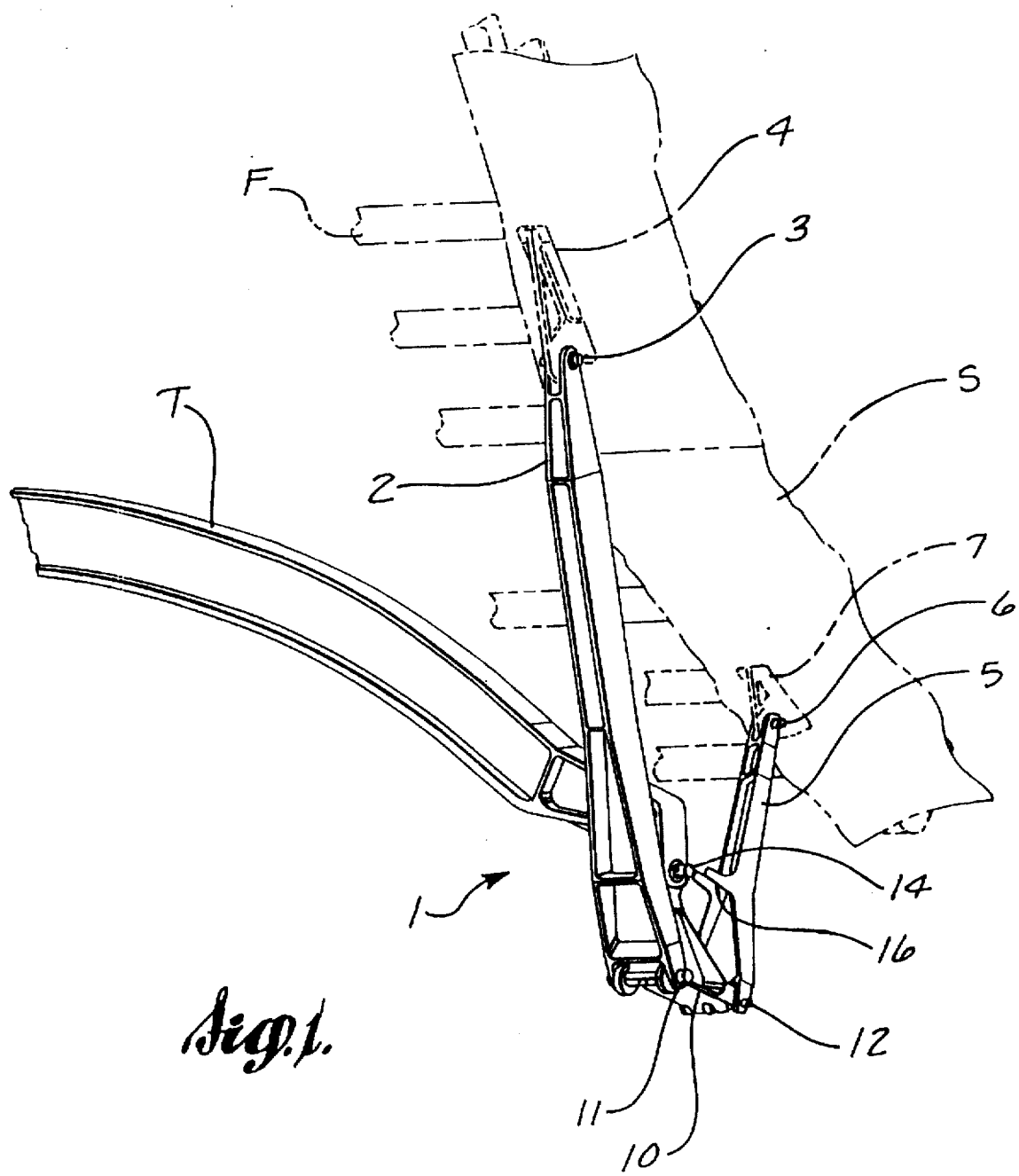
FIG. 1 is a rear perspective of a bipod load support in accordance with the present invention as used for supporting the aft end of a trailing edge flap track from the body of an aircraft.

The drawings illustrate application of the load bearing support of the present invention in conjunction with an aircraft, only parts of which are shown diagrammatically. In general, the support of the present invention is mounted on the outer arcuate skin S of the aircraft body, such skin being supported by the aircraft frame F. The support movably secures the aft end of a generally horizontal, arcuate track T along which part of the actuating mechanism for a trailing edge flap of the aircraft rides. The trailing edge flap actuating mechanism is constructed in such a way that force applied to the track is directed primarily upward, particularly when the flap is extended and the actuating mechanism rides close to the aft end of the track.

In the preferred embodiment, the support 1 of the present invention includes a long upright first or outboard leg 2. The upper end of leg 2 is pivoted by a self-aligning bearing 3 to an upper bracket 4 which, in turn, is secured to the skin of the aircraft. Similarly, a shorter second or inboard leg 5 is pivoted by a self-aligning bearing 6 to a lower bracket 7 secured to the skin S at a point below and inboard of the upper bracket 4.

Figure 2:
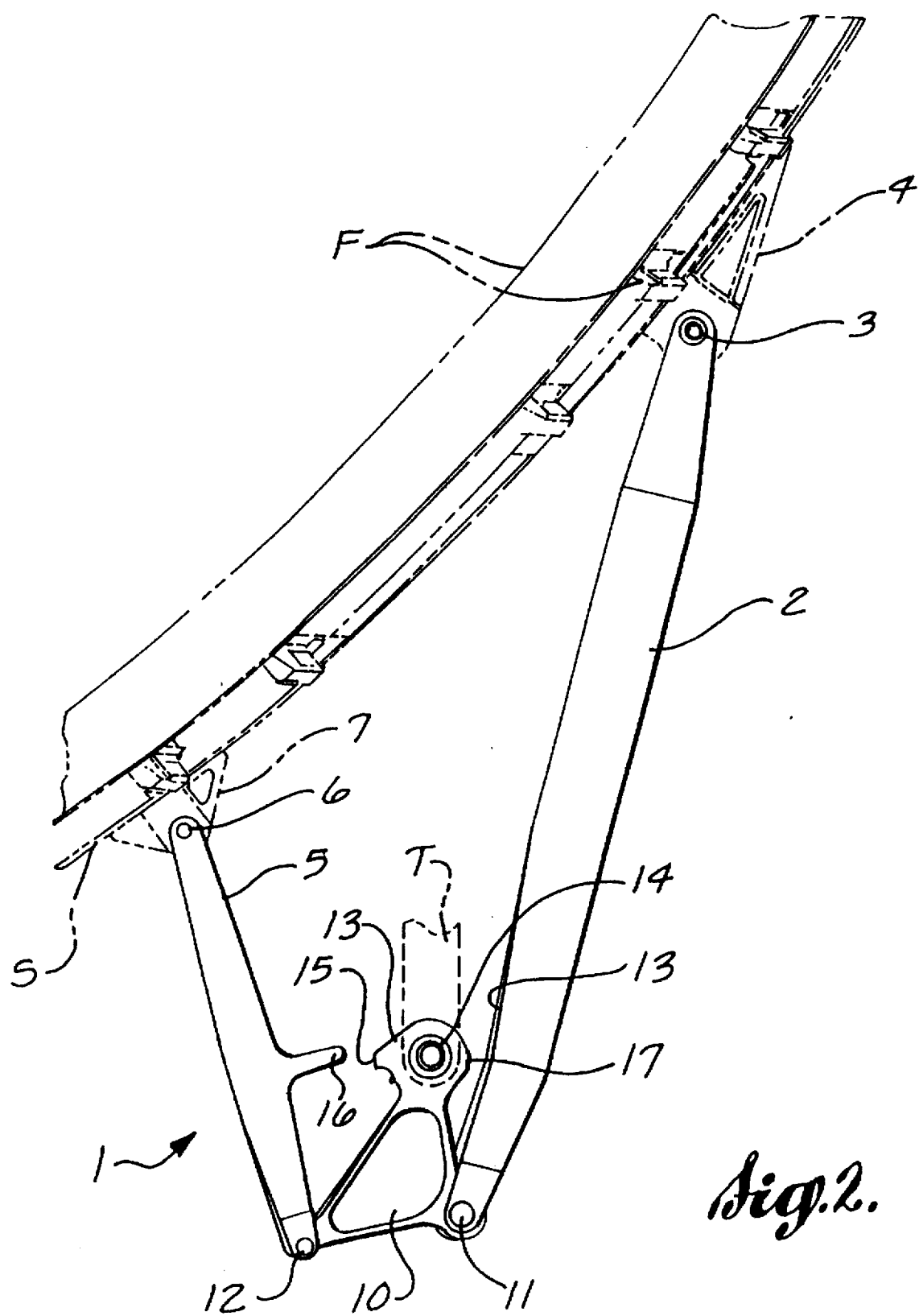
FIG. 2 is an end elevation of the support of FIG. 1.
Figure 3:
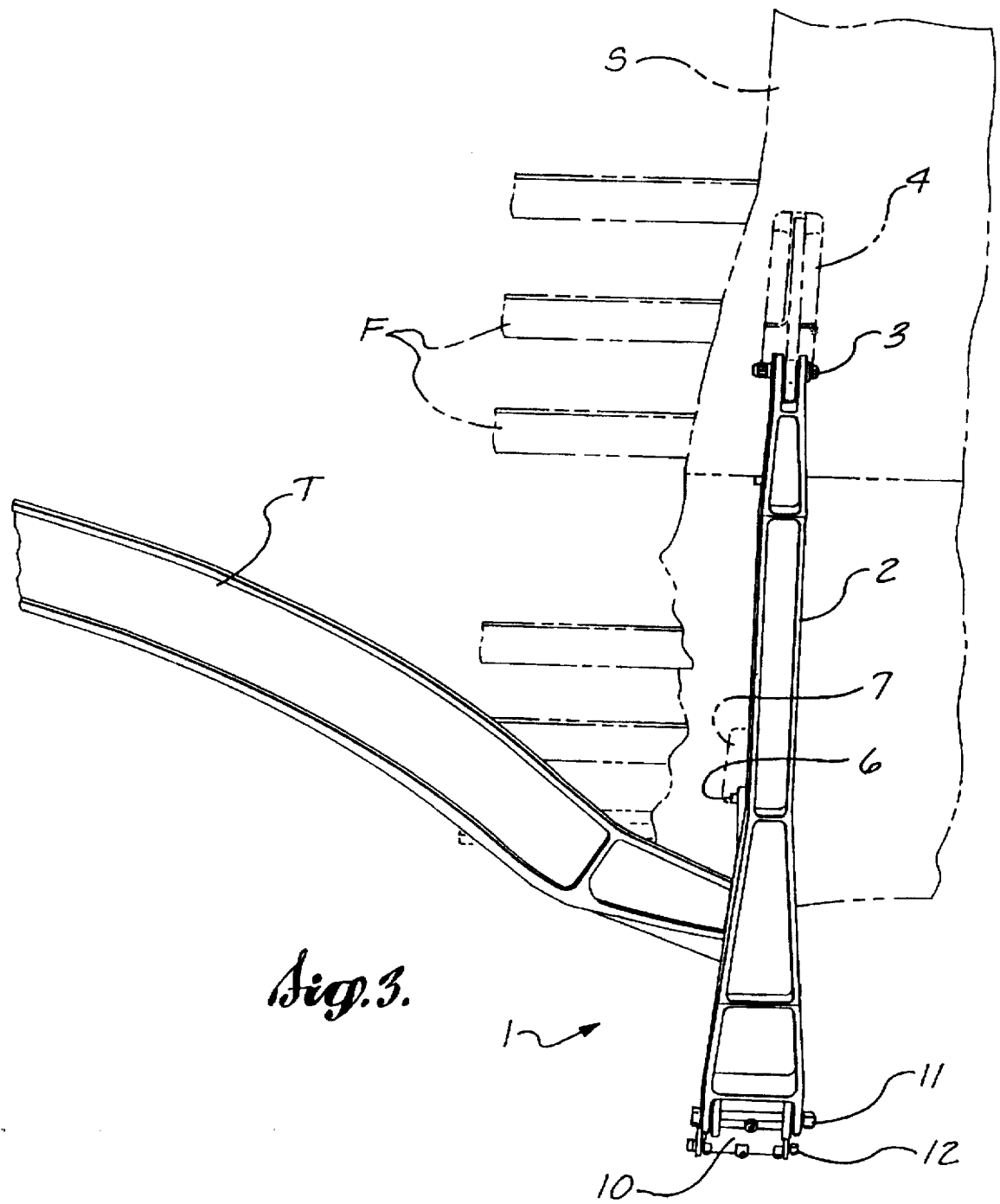
FIG. 3 is a side elevation of the support of FIG. 1.

As best seen in FIG. 2, a generally triangular load bearing member 10 has bottom corner portions pivoted to the outboard leg 2 and inboard leg 5 by hinge pins 11 and 12, respectively. The horizontal distance between such pivoted corner portions of the support member 10 is less than the horizontal distance between the upper bearings 3 and 6, with the result being that the each of the outboard and inboard legs 2 and 5 converge downward, each being disposed at a small acute angle to vertical.

The triangular support member 10 has an upper corner portion 13 carrying the bearing 14 by which the aft end of the track T is secured to the support member. Such upper corner portion forms an enlarged head having an inboard nose 15 generally aligned with a stop projection 16 extending outboard from the inboard leg 5. The opposite side of the load bearing head of the support member has a flatter nose 17 aligned with the inboard side 18 of the outboard leg 2.

The geometry of the support 1 is such that the upper bearing or load connection point 14 of the member 10 is positioned closer to the outboard leg 2 than to the inboard leg 5. In addition, the support utilizes the arcuate geometry of the aircraft body in transmitting force through the legs 2 and 5 and their connection brackets 4 and 7 to the aircraft. More specifically, the location of the connection point 14 of the load bearing member in conjunction with the length of the outboard leg and its point of attachment to the aircraft body by bracket 4 results in at least about two thirds of any upward directed force applied by the aft end of the track T being transmitted through the outboard leg 2. As noted above, such leg is disposed at a small acute angle to vertical, and it also is disposed at a small acute angle to a tangent of the arcuate skin of the aircraft in the area of the upper bracket 4. Still more specifically, from the central equilibrium position shown, a line connecting the point 14 of load application to the load bearing member 10 and the upper pivot 3 for the outboard leg 2 is nearly tangential to the arcuate body skin. The result is that force transmitted through the upper leg 2 (which constitutes by far the major portion of any force applied to the load bearing member) is transmitted to the skin almost entirely as shear, with at most a small radial component or punch load. Since the skin can withstand a substantially greater shear force along the length of the connection bracket 4 than a concentrated radial force, it is not necessary that the support be located in a heavily reinforced area of the aircraft. In a representative installation the upward force exerted at point 14 can be in the range of 14,000 pounds, of which force in the neighborhood of 10,000 pounds is transmitted through the outboard leg 2. The outboard leg can be about 25 inches long, with the other parts scaled as shown in the drawings.

From the central position illustrated in the drawings, the aft end of the track T can be shifted inboard or outboard within the constraints of the motion limiting stop structure, i.e., nose 15 in conjunction with stop 16 and nose 17 in conjunction with the adjacent inboard side of the outboard leg 2. Because of the overall geometry, approximately equal inboard and outboard movement of the aft end of the track is permitted, which need be only a few inches in each direction to accommodate for deflections of the aircraft wing and flap relative to the body and deflections caused by the flap actuators.

The support stably mounts the load bearing member 10 such that the central position shown is a stable equilibrium position. Stated in another way, if the upper end of the support member is deflected inboard or outboard, upward directed force tends to return the support member to the central position. In order for this to be achieved, it is important that the legs 2 and 5 be angled toward each other from their upper pivot points.

The tendency of the support member to return to a central position upon application of an upward directed force can be adjusted by changing the relative lengths and placements of the legs. For example, if the upper ends of the legs are spaced farther apart horizontally, there is a greater tendency for the upper end of the load bearing member 10 to return to the central position when deflected, i.e., a greater force biasing the load bearing member to the central position for a given travel laterally in either direction.

While the preferred application for the present invention is to mount the aft end of a trailing edge flap track to the body of an aircraft, and the invention has particular novelty and utility for such an application, it should be appreciated that there may be other applications for the support with modified geometry, particularly for bearing a load in one direction with swinging legs pivoted to the load bearing member "downstream" with reference to the direction of force application, and in applications where it is desirable to transmit force as shear rather than as a punch load requiring stronger and heavier reinforcement of the body of a vehicle. While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A support for carrying a load applied primarily in a first direction, comprising a body, a first elongated leg extending at an angle to the first direction and having a first end portion and a second end portion, the first leg being pivoted at its first end portion to the body for swinging about a first axis, a second elongated leg extending at an angle to the first direction and having a first end portion and a second end portion, the second leg being pivoted at its first end portion to the body for swinging about a second axis parallel to but offset a fixed distance from the first axis, and a load bearing member having corner portions pivoted, respectively, to the second end portions of the legs for swinging relative to the second end portions of the first and second legs about third and fourth axes, respectively, spaced apart but parallel to the first and second axes, the load bearing member extending generally between the first and second legs from the points of pivotal connection thereto toward the first pivoted end portions of the legs, the load bearing member having a load connection point adapted for application of the load thereto without application of force to the first and second legs other than through the load bearing member, the points of pivotal connection of the second end portions of the first and second legs to the load bearing member being spaced apart a distance less than the distance between the first and second axes such that the first and second legs are angled toward each other from the first end portions to the second end portions, the first leg, second leg and load bearing member being constructed and arranged relatively such that application of force in the first direction at the load connection point tends to move the support to a stable central equilibrium position from which the load bearing member can move laterally by relative movement of the first and second legs without changing the fixed distance between the first and second axes, and the load connection point in such stable central equilibrium position being disposed such that a line extending in the first direction from such load connection point passes between the first and second axes.

2. The support defined in claim 1, in which the load connection point of the load bearing member is closer to the first leg than to the second leg when the support is in the stable central equilibrium position.

3. The support defined in claim 1, in which the first leg is substantially longer than the second leg.

4. The support defined in claim 3, in which the load connection point of the load bearing member is closer to the first leg than the second leg when the support is in the stable central equilibrium position.

5. The support defined in claim 1, in which the load bearing member, the first leg and the second leg have cooperating stops limiting the extent of lateral movement of the load beating member from the stable central equilibrium position in both directions.

6. A support for carrying a load applied upwardly, comprising a body, a first elongated upright leg having an upper end portion and a lower end portion, the first leg being pivoted at its upper end portion to the body for swinging about a first axis, a second elongated upright leg having an upper end portion and a lower end portion, the second leg being pivoted at its upper end portion to the body for swinging about a second axis parallel to but offset a fixed distance horizontally from the first axis, and a load bearing member having lower portions pivoted, respectively, to the lower end portions of the legs for swinging relative to the lower end portions of the first and second legs about third and fourth axes, respectively, spaced apart horizontally but parallel to the first and second axes, the load bearing member extending generally upward between the first and second legs from the points of pivotal connection thereto toward the upper end portions of the legs, the load bearing member having a load connection point above its pivoted lower portions adapted for application of the load thereto without application of force to the first and second legs other than through the load bearing member, the points of pivotal connection of the lower end portions of the first and second legs to the load beating member being spaced apart horizontally a distance less than the distance between the first and second axes such that the first and second legs are angled downward and toward each other from the upper end portions to the lower end portions, the first leg, second leg and load beating member being constructed and arranged relatively such that upward application of force at the load connection point tends to move the support to a stable central equilibrium position from which the load bearing member can move laterally by relative movement of the first and second legs without changing the fixed distance between the first and second axes, and the load connection point in such stable central equilibrium position being disposed such that a line extending vertically upward from such load connection point passes between the first and second axes.

7. The support defined in claim 6, in which the load connection point of the load beating member is closer to the first leg than the second leg when the support is in the stable central equilibrium position.

8. The support defined in claim 6, in which the first leg is substantially longer than the second leg.

9. The support defined in claim 8, in which the load connection point of the load bearing member is closer to the first leg than the second leg when the support is in the stable central equilibrium position.

10. The support defined in claim 6, in which the load bearing member, the first leg and the second leg have cooperating stops limiting the extent of lateral movement of the load bearing member from the stable central equilibrium position in both directions.

11. In a vehicle having a body with a convexly arcuate outer skin, a support attached to the skin for carrying a load applied primarily in a first direction, said support comprising a first elongated leg extending at an angle to the first direction and having a first end portion and a second end portion, a first bracket secured to the skin and pivotally mounting the first end portion of the first leg for swinging of the first leg about a first axis, a second elongated leg extending at an angle to the first direction and having a first end portion and a second end portion, a second bracket secured to the skin and pivotally mounting the first end portion of the second leg for swinging of the second leg about a second axis parallel to but offset from the first axis, and a load bearing member having outer portions pivoted, respectively, to the second end portion of the first and second legs for swinging of the load bearing member relative to the second end portions of the first and second legs about third and fourth axes, respectively, spaced apart but parallel to the first and second legs from the points of pivotal connection thereto generally toward the vehicle body and having a load connection point adapted for application of the load thereto, the points of pivotal connection of the second end portions of the first and second legs to the load bearing member being spaced apart a distance less than the distance between the first and second axes such that the first and second legs are angled toward each other from the first end portions to the second end portions, the first leg, second leg and load beating member being constructed and arranged relatively such that application of force in the first direction at the load connection point tends to move the support to a stable central equilibrium position from which the load beating member can move laterally by relative movement of the first and second legs, and the load connection point in such stable equilibrium position being disposed such that a line extending in the first direction from such load connection point passes between the first and second axes.

12. The support defined in claim 11, in which the first leg extends at a small acute angle to a tangent of the outer skin at the location the first bracket.

13. The support defined in claim 11, in which the first leg, second leg and load bearing member are constructed and arranged relatively such that a line extending from the load connection point through the first axis is nearly tangential to the outer skin of the vehicle body.

14. The support defined in claim 11, in which the first leg is much longer than the second leg.

15. The support defined in claim 11, in which the first leg, second leg and load bearing member are constructed and arranged relatively such that a majority of the force applied at the load connection point in the first direction is transmitted through the first leg to the first bracket.

16. The support defined in claim 11, in which the load connection point of the load bearing member is closer to the first leg than the second leg when the support is in the central stable equilibrium position.

17. The support defined in claim 11, in which the first leg, second leg and load bearing member are constructed and arranged relatively such that a majority of the force applied at the load connection point in the first direction is transmitted through the first leg and primarily as shear through the first bracket to the outer skin of the vehicle body rather than as a punch load.

18. The support defined in claim 11, in which the vehicle is an aircraft having a trailing edge flap track, said track having an aft end connected to the load connection point.

* * * * *

UNITED STATES PATENT AND TRADEMARK OFFICE
CERTIFICATE OF CORRECTION

PATENT NO. : 5,722,621
DATED : March 3, 1998
INVENTOR(S) : J. Noble et al.

Page 1 of 2

It is certified that error appears in the above-identified patent and that said Letters Patent is hereby corrected as shown below:

| COLUMN | LINE | |
|---|---|---|
| [57] Pg. 1, col. 2 | Abstract 6 of text | "beating" should read --bearing-- |
| 4 (Claim 1, | 66 line 11) | "comer" should read --corner-- |
| 5 (Claim 5, | 39 line 4) | "beating" should read --bearing-- |
| 5 (Claim 6, | 63 line 23) | "beating" should read --bearing-- |
| 6 (Claim 6, | 1 line 28) | "beating" should read --bearing-- |
| 6 (Claim 7, | 12 line 2) | "beating" should read --bearing-- |
| 6 (Claim 11, | 53 line 28) | "beating" should read --bearing-- |

UNITED STATES PATENT AND TRADEMARK OFFICE
CERTIFICATE OF CORRECTION

PATENT NO. : 5,722,621
DATED : March 3, 1998
INVENTOR(S) : J. Noble et al.

It is certified that error appears in the above-identified patent and that said Letters Patent is hereby corrected as shown below:

COLUMN     LINE

6              56              "beating" should read --bearing--
(Claim 11,     line 31)

Signed and Sealed this

Twenty-sixth Day of May, 1998

Attest:

BRUCE LEHMAN

*Attesting Officer*              *Commissioner of Patents and Trademarks*